UNITED STATES PATENT OFFICE.

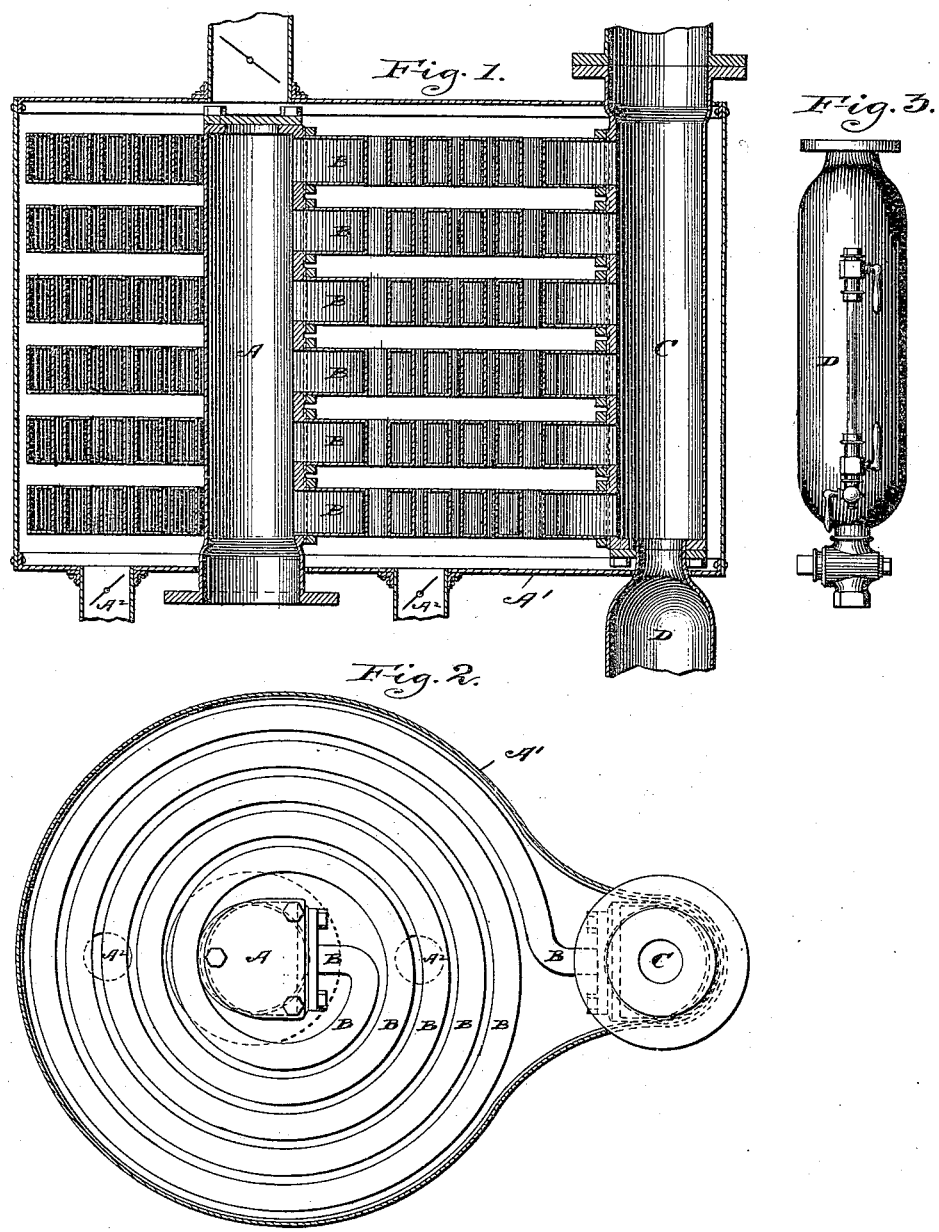

OTTO CHRISTIAN HAGEMANN, OF LONDON, ENGLAND, ASSIGNOR TO JAMES S. KIRK & CO., OF CHICAGO, ILLINOIS, AND ALBERT DOMEIER, OF LONDON, ENGLAND.

PROCESS OF PURIFYING GLYCERINE.

SPECIFICATION forming part of Letters Patent No. 428,484, dated May 20, 1890.

Application filed December 31, 1889. Serial No. 335,479. (No model.) Patented in England July 1, 1885, No. 7,972.

*To all whom it may concern:*

Be it known that I, OTTO CHRISTIAN HAGEMANN, of London, England, have invented certain new and useful Improvements in the Purification of Glycerine, (for which I have obtained English Patent No. 1,972, dated July 1, 1885,) of which the following is a specification.

At the present time it is usual to purify glycerine by distillation, but it is found that an appreciable amount of inorganic impurity passes over together with the vapor. Now, I have found that much of this impurity may be removed by conducting the vapor through a passage formed by pipes or channels having a curved wall against which the vapors impinge, and which wall is externally cooled to cause a partial condensation of the vapor.

In the preferred form of apparatus I employ a series of pipes or channels in the form of spirals or volutes arranged side by side in parallel planes and forming passages which serve to connect a central main by which the vapor is brought from the still or generator, with an outer receiving-main which leads the vapor to the condenser. There is a receptacle on the receiving-main into which the small quantity of glycerine condensed in the passages flows, and this glycerine is drawn off from time to time and is found to contain most of the impurities. The flow of vapor may be inward toward the center in place of outward, the effect in either case being to bring the condensed particles into contact with the walls or sides of the pipes or channels, so that they deposit thereon in place of remaining held in suspension by the vapor.

In the accompanying drawings, Figure 1 is a vertical section of the apparatus which I employ to purify the vapor of glycerine after it leaves the still and before it reaches the condenser from which the product is drawn. Fig. 2 is a plan. Fig. 3 is an elevation of a receiver used in connection with the purifying apparatus shown in Fig. 1.

A is a pipe or channel, which receives the glycerine-vapor as it leaves the still.

B B B are spirals, preferably of copper pipe, angular in section, communicating at one end with the central pipe A and at the other end with a pipe C.

D is a receiver, into which any glycerine condensed in the spirals passes.

The spirals I preferably inclose in a casing A', at the bottom of which there is an air-inlet provided with a regulating-valve A², and at the top of the casing is a valve-controlled outlet, so that the quantity of cold air flowing through the casing may be under complete control. I vary the number of the spirals according to the dimensions of the still; or I may increase or diminish the dimensions of the individual spirals.

I find it suitable so to conduct the operation that about ten per cent. of the product may find its way into the receiver D; but this may be varied according to circumstances and the degree of purity to which it is desired to attain in this apparatus. By due regulation of the air-current passing among the spirals the proportion arrested in the receiver D is readily adjusted.

The operation is as follows: The vapor laden with impurities moves with some velocity through the passage, pursuing a curved path, and is caused to impinge upon the outer walls of such passage, which, being kept cooled as far as necessary by the circulation of air around them, cause a small proportion of the glycerine to condense, thus moistening the surfaces, and the impurities which are heavier than the glycerine-vapor being also projected against the moistened surfaces are arrested and in turn washed off by the glycerine condensed in the further operation, being carried down therewith, and finally flow into the receiver D. This receiver is furnished with a gage-glass, as shown, and the glycerine containing the impurities is drawn off from time to time or returned to the still direct by a suitable pipe, while the comparatively pure vapor passes on from the top of the pipe C to a condenser.

I claim—

1. The method of purifying glycerine which consists in conducting the vapor thereof laden with impurities through a passage having a curved wall externally cooled, and upon which the vapors are caused to impinge, whereby partial condensation and the arrest of the impurities are effected, substantially as described.

2. The method of purifying glycerine-vapor on its passage from the still to the condenser which consists in causing the said vapor to pass through spirals, volutes, or other continuously curved channels, which are cooled to produce partial condensation within them, whereby the non-volatile impurities in the glycerine-vapor are brought into contact with moistened surfaces and are retained, substantially as described.

OTTO CHRISTIAN HAGEMANN.

Witnesses:
OLIVER R. JOHNSON,
*Vice and Deputy Consul-General.*
FRANCIS W. FRIGOUT,
*Deputy Consul-General U. S. A., London, England.*